(12) United States Patent
Sun et al.

(10) Patent No.: US 12,469,116 B2
(45) Date of Patent: Nov. 11, 2025

(54) METHOD FOR TRAINING IMAGE PROCESSING MODEL, AND METHOD FOR GENERATING HIGH DYNAMIC RANGE IMAGE

(71) Applicant: BOE TECHNOLOGY GROUP CO., LTD., Beijing (CN)

(72) Inventors: Mengdi Sun, Beijing (CN); Guannan Chen, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/910,020

(22) PCT Filed: Sep. 17, 2021

(86) PCT No.: PCT/CN2021/119180
§ 371 (c)(1),
(2) Date: Sep. 8, 2022

(87) PCT Pub. No.: WO2023/039863
PCT Pub. Date: Mar. 23, 2023

(65) Prior Publication Data
US 2024/0202891 A1   Jun. 20, 2024

(51) Int. Cl.
*G06T 5/92* (2024.01)
*G06T 5/50* (2006.01)
*G06T 5/60* (2024.01)

(52) U.S. Cl.
CPC ............ *G06T 5/92* (2024.01); *G06T 5/50* (2013.01); *G06T 5/60* (2024.01); *G06T 2207/20081* (2013.01); *G06T 2207/20208* (2013.01)

(58) Field of Classification Search
CPC ....... G06T 2207/20208; G06T 5/90–94; G06T 3/4053; G06T 3/4076; G06T 2207/10024;
(Continued)

(56) References Cited

U.S. PATENT DOCUMENTS

| 9,697,592 B1* | 7/2017 | Dai ................... G06F 18/23211 |
| 2009/0027545 A1* | 1/2009 | Yeo .......................... H04N 25/57 382/168 |
| 2022/0067890 A1* | 3/2022 | Zhang ..................... G06T 9/002 |

OTHER PUBLICATIONS

Chen, Xiangyu, et al. "Hdrunet: Single image hdr reconstruction with denoising and dequantization." Proceedings of the IEEE/CVF Conference on Computer Vision and Pattern Recognition. 2021. (Year: 2021).*

* cited by examiner

*Primary Examiner* — Michael Horabik
*Assistant Examiner* — Stefano Anthony Dardano
(74) *Attorney, Agent, or Firm* — XSENSUS LLP

(57) ABSTRACT

A method for training an image processing model includes: inputting a low dynamic range image into a first initial image processing model, so that a high dynamic range reconstruction processing is performed on the low dynamic range image to generate a first high dynamic range image; inputting the low dynamic range image into a second initial image processing model to generate a first coefficient; generating a second high dynamic range image according to the first high dynamic range image and the first coefficient; generating a loss function according to data pairs of the second high dynamic range image and a real high dynamic range image, the real high dynamic range image corresponding to the low dynamic range image; and training the first initial image processing model and the second initial image processing model with the loss function.

20 Claims, 5 Drawing Sheets

(58) Field of Classification Search
CPC ............. G06T 5/50; G06T 2207/20221; G06T 2207/20081; G06T 5/92; G06T 2207/20084; G06T 5/60; G06T 3/4046; G06V 10/20; G06V 10/80–817; G06V 10/761; G06V 10/462; G06V 10/764; G06V 10/7715; G06V 10/82; G06N 3/02–105

See application file for complete search history.

METHOD FOR TRAINING IMAGE PROCESSING MODEL, AND METHOD FOR GENERATING HIGH DYNAMIC RANGE IMAGE

CROSS-REFERENCE TO RELATED APPLICATION

This application is a national phase entry under 35 USC 371 of International Patent Application No. PCT/CN2021/119180, filed on Sep. 17, 2021, which is incorporated herein by reference in its entirety.

TECHNICAL FIELD

The present disclosure relates to the field of computer technologies, and in particular, to a method for training an image processing model, a method for generating a high dynamic range image, an electronic device and a computer-readable storage medium.

BACKGROUND

The high dynamic range imaging (HDRI) technology is an image representation method used to achieve a wider exposure range than ordinary digital images, and high dynamic range (HDR) images may provide a wider range of brightness variation and more details in terms of light and shade than the ordinary digital images, so that the high dynamic range images present brightness variation information that is closer to a real scene. At present, there is a technology for converting low dynamic range (LDR) images into high dynamic range images, so as to restore illumination information approximating the real scene.

SUMMARY

In an aspect, a method for training an image processing model is provided. The method for training the image processing model includes: inputting a low dynamic range image into a first initial image processing model, so that a high dynamic range reconstruction processing is performed on the low dynamic range image to generate a first high dynamic range image; inputting the low dynamic range image into a second initial image processing model to generate a first coefficient; generating a second high dynamic range image according to the first high dynamic range image and the first coefficient; generating a loss function according to data pairs of the second high dynamic range image and a real high dynamic range image, the real high dynamic range image corresponding to the low dynamic range image; and training the first initial image processing model and the second initial image processing model with the loss function, so that a trained first target image processing model and a trained second target image processing model are obtained.

In some embodiments, the first coefficient is a weight coefficient generated by the second initial image processing model performing a structural feature analysis on the low dynamic range image.

In some embodiments, the weight coefficient is a 1×1×3 matrix.

In some embodiments, the low dynamic range image, the first high dynamic range image and the second high dynamic range image each include RGB channels, and further include a fourth channel. The loss function is further related to the fourth channel.

In some embodiments, the fourth channel is a maximum value of a pixel. The loss function includes an L1 loss and a tone mapping loss of RGB data pairs of the second high dynamic range image and the real high dynamic range image, and an L1 loss of data pairs of maximum values of pixels of the second high dynamic range image and the real high dynamic range image.

In some embodiments, generating the second high dynamic range image according to the first high dynamic range image and the first coefficient includes:
multiplying the first high dynamic range image by the first coefficient to generate the second high dynamic range image.

In some embodiments, before inputting the low dynamic range image into the second initial image processing model, the method for training the image processing model further includes: performing a down-sampling processing on the low dynamic range image to generate a down-sampled low dynamic range image.

In some embodiments, a number of layers of the second initial image processing model is less than a number of layers of the first initial image processing model.

In some embodiments, the method for training the image processing model further includes: in a process of training the first initial image processing model and the second initial image processing model with the loss function, if the loss function does not converge, updating parameters of the first initial image processing model and parameters of the second initial image processing model. A network optimizer is an Adam optimizer, and a learning rate is 1e-4.

In another aspect, a method for generating a high dynamic range image is provided. The method for generating the high dynamic range image includes: inputting an image to be processed into a first target image processing model, so that a high dynamic range reconstruction processing is performed on the image to be processed to generate a first processed image, the image to be processed being the low dynamic range image; inputting the image to be processed into a second target image processing model to generate a second coefficient, the first target image processing model and the second target image processing model being the trained first target image processing model and the trained second target image processing model obtained by the method for training image processing model according to any one of the above embodiments; and generating a second processed image according to the first processed image and the second coefficient.

In some embodiments, the second coefficient is a weight coefficient generated by the second target image processing model performing a structural feature analysis on the image to be processed.

In some embodiments, generating the second processed image according to the first processed image and the second coefficient includes: multiplying the first processed image by the second coefficient to generate the second processed image.

In some embodiments, before inputting the image to be processed into the second target image processing model, the method for generating the high dynamic range image further includes: performing a down-sampling processing on the image to be processed to generate a down-sampled image to be processed.

In some embodiments, a number of layers of the second target image processing model is less than a number of layers of the first target image processing model.

In yet another aspect, an electronic device is provided. The electronic device includes a processor, a memory and a computer program stored on the memory and executable on the processor. The processor is configured to input a low dynamic range image into a first initial image processing model, so that a high dynamic range reconstruction processing is performed on the low dynamic range image to generate a first high dynamic range image. The processor is further configured to input the low dynamic range image into a second initial image processing model to generate a first coefficient. The processor is further configured to generate a second high dynamic range image according to the first high dynamic range image and the first coefficient.

The processor is further configured to generate a loss function according to data pairs of the second high dynamic range image and a real high dynamic range image. The real high dynamic range image corresponds to the low dynamic range image. The processor is further configured to train the first initial image processing model and the second initial image processing model with the loss function, so that a trained first target image processing model and a trained second target image processing model are obtained. The memory is configured to store data of the first high dynamic range image, the first coefficient, and data of the second high dynamic range image.

In some embodiments, the processor is further configured to multiply the first high dynamic range image by the first coefficient to generate the second high dynamic range image. The processor is further configured to perform a down-sampling processing on the low dynamic range image to generate a down-sampled low dynamic range image before inputting the low dynamic range image into the second initial image processing model.

In some embodiments, the processor is further configured to input an image to be processed into the first target image processing model, so that a high dynamic range reconstruction processing is performed on the image to be processed to generate a first processed image. The image to be processed is the low dynamic range image. The processor is further configured to input the image to be processed into the second target image processing model to generate a second coefficient. The processor is further configured to generate a second processed image according to the first processed image and the second coefficient. The memory is further configured to store the first processed image, the second coefficient and the second processed image.

In some embodiments, the processor is further configured to multiply the first processed image by the second coefficient to generate the second processed image. The processor is further configured to perform a down-sampling processing on the image to be processed to generate a down-sampled image to be processed before inputting the image to be processed into the second target image processing model.

In yet another aspect, a non-transitory computer-readable storage medium is provided. The computer-readable storage medium has stored thereon computer program instructions that, when executed on a processor, cause the processor to perform the method for training the image processing model according to some embodiments described above, and/or, the method for generating the high dynamic range image according to some embodiments described above.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
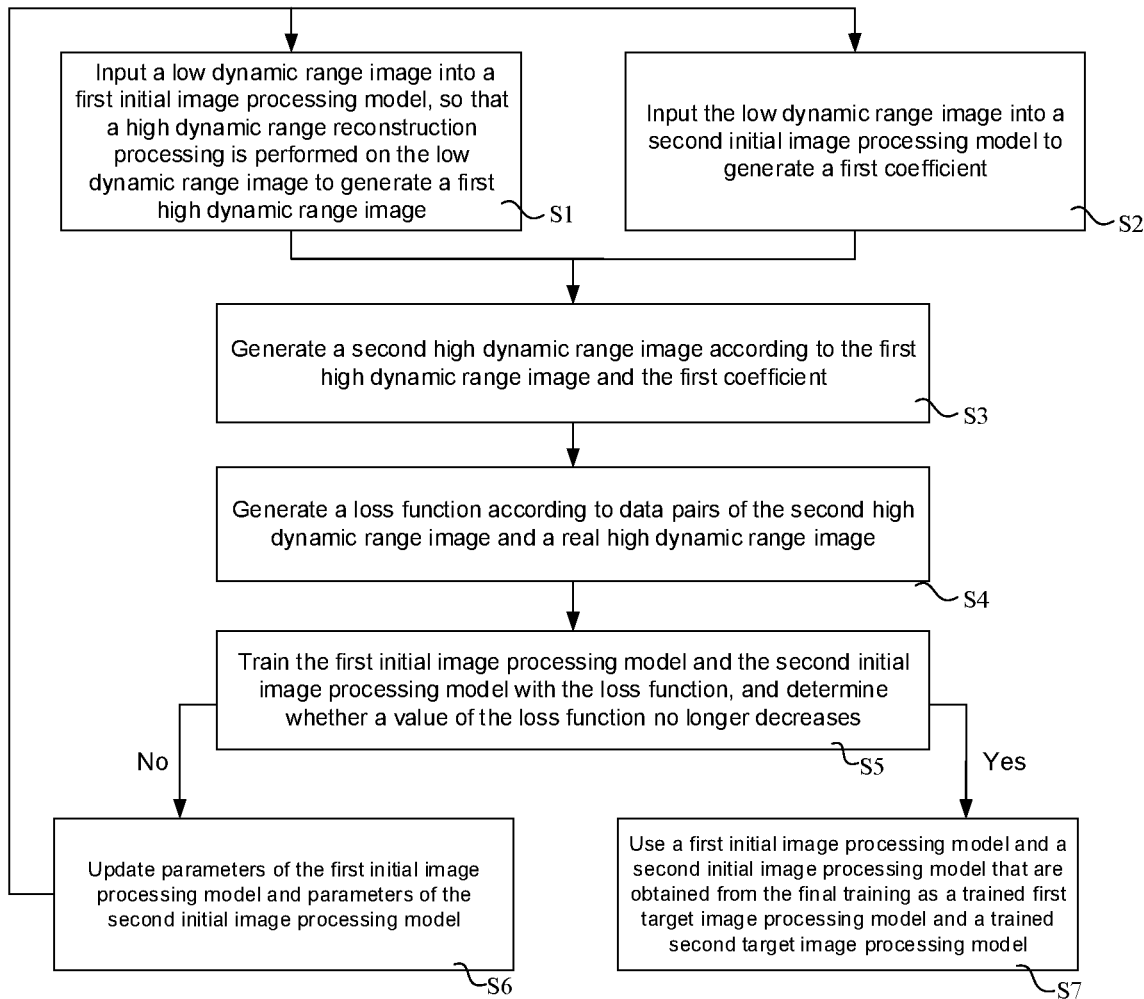
FIG. 1 is a flow diagram of a method for training a high dynamic range image, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "multiple", "a plurality of" or "the plurality of" means two or more unless otherwise specified.

In the description of some embodiments, the terms "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "A and/or B" includes the following three combinations: only A, only B, and a combination of A and B.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "in a case where it is determined" or "in response to determining" or "in a case where [the stated condition or event] is detected" or "in response to detecting [the stated condition or event]", depending on the context.

The use of the phase "applicable to" or "configured to" herein means an open and inclusive expression, which does not exclude devices that are applicable to or configured to perform additional tasks or steps.

Additionally, the use of the phase "based on" is meant to be open and inclusive, since a process, step, calculation or other action that is "based on" one or more of the stated conditions or values may, in practice, be based on additional conditions or value beyond those stated.

High dynamic range images may be used to describe a real scene with a wide range of brightness variation, and may better show optical characteristics of high-brightness areas and low-dark areas in the scene. Generally, images captured by ordinary cameras with a limited dynamic range are called low dynamic range images. In order to accurately reflect images in the real scene, it is necessary to convert low dynamic range images into high dynamic range images through some techniques. In the related art, for a single low dynamic range image, based on deep learning, a high dynamic range reconstruction method is used to convert the low dynamic range images into the high dynamic range images through a set image generation network. However, the high dynamic range images obtained through the method in the related art have low authenticity, which may fail to restore the illumination information of the real scene accurately.

Figure 2:
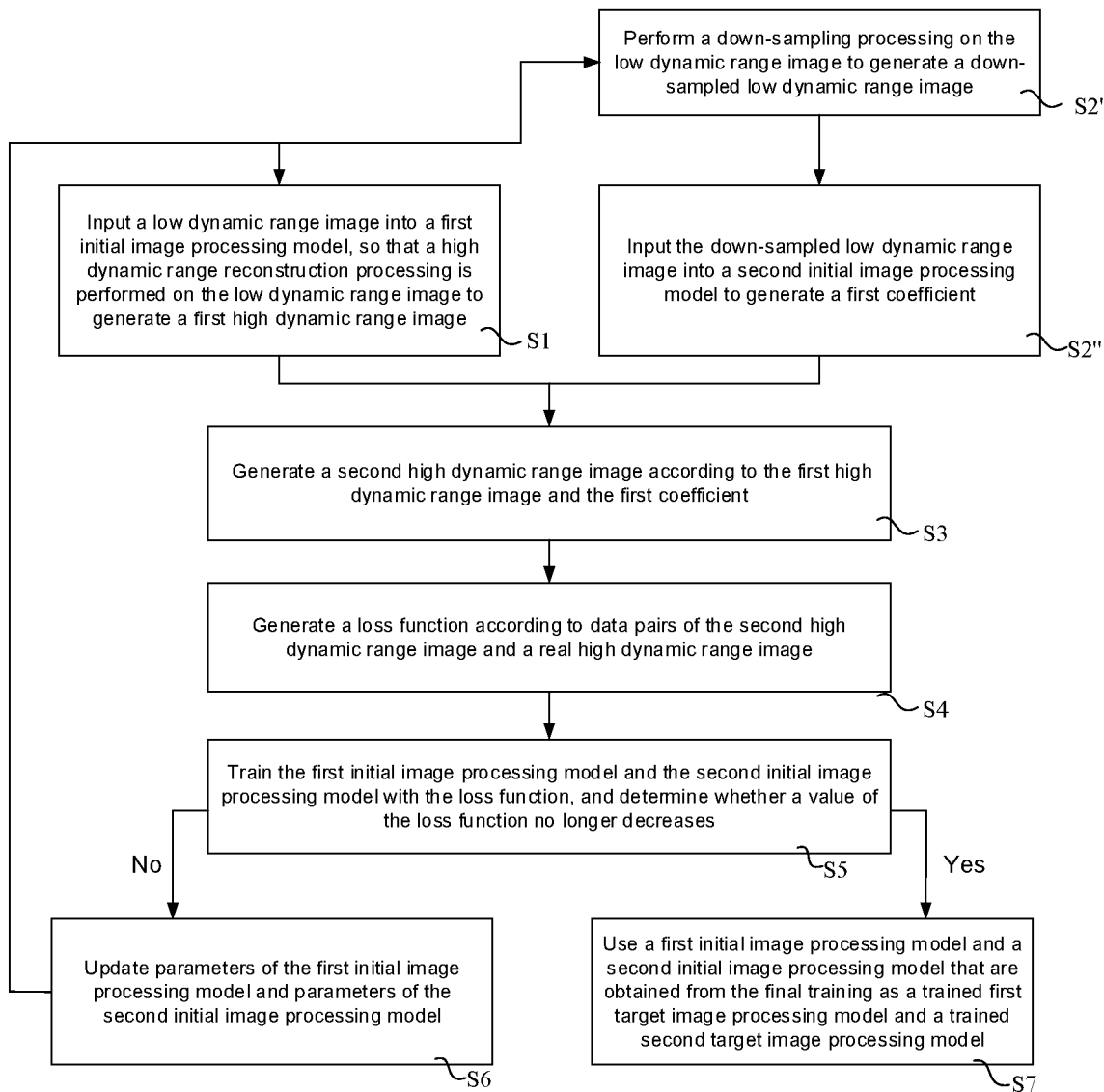
FIG. 2 is a flow diagram of a method for training a high dynamic range image, in accordance with some other embodiments.
Figure 3:
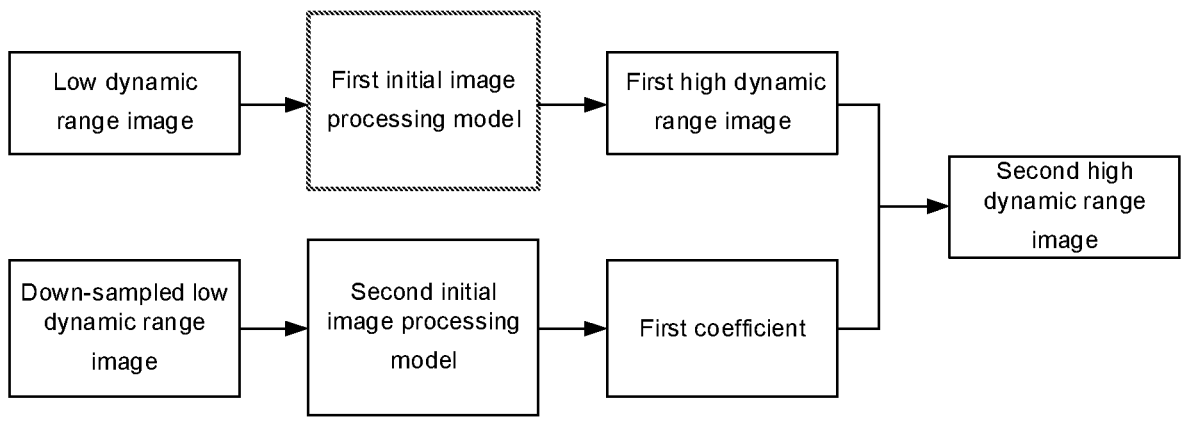
FIG. 3 is a step diagram of a method for training a high dynamic range image, in accordance with some embodiments.

Based on this, some embodiments of the present disclosure provide a method for training an image processing model. As shown in FIGS. 1, 2 and 3, the method includes steps S1 to S7.

In S1, a low dynamic range image is input into a first initial image processing model, so that a high dynamic range reconstruction processing is performed on the low dynamic range image to generate a first high dynamic range image.

The low dynamic range image is a randomly selected low dynamic range image, and there is a real high dynamic range image corresponding to the low dynamic range image. For example, image data pairs of the low dynamic range image and the corresponding real high dynamic range image are selected from an existing public data set, and the low dynamic range image is used as a sample for training the first initial image processing model and a second initial image processing model.

In S2, the low dynamic range image is input into the second initial image processing model to generate a first coefficient.

The first initial image processing model and the second initial image processing model are each an image processing network. For example, the image processing network is a neural network, the first initial image processing model and the second initial image processing model each have initial setting parameters, and the first initial image processing model has an initial mapping relationship from a low dynamic range image to a high dynamic range image, which can be used to convert the low dynamic range image into the high dynamic range image.

In some embodiments, in the above steps, the second initial image processing model performs a structural feature analysis on the low dynamic range image to generate a weight coefficient of the first high dynamic range image. The first coefficient is the weight coefficient generated by the second initial image processing model performing the structural feature analysis on the low dynamic range image. The first coefficient is used for detail supplementation and restoration of the first high dynamic range image.

In some embodiments, the weight coefficient is a 1×1×3 matrix.

In some embodiments, as shown in FIG. 2, before inputting the low dynamic range image into the second initial image processing model, the method further includes step S2'.

In S2', a down-sampling processing is performed on the low dynamic range image to generate a down-sampled low dynamic range image.

For example, for a low dynamic range image with a size of M×N, s-times down-sampling processing is performed to obtain a resolution image with a size of (M/s)×(N/s), where s is a common divisor of M and N. That is, an image in an s×s window of an original image is taken as a single pixel, and a value of the pixel is an average value of values of all pixels in the window. In this case, the number of pixels in the image is reduced to s-square times the number of pixels in the original s×s window.

For example, a double bicubic down-sampling processing is performed on the low dynamic range image to obtain a resolution image with a size of (M/2)×(N/2). An image in a 2×2 window of the original image is taken as a single pixel, and a value of the pixel is obtained through a formula $\Sigma_{i=0}^{3}\Sigma_{j=0}^{3}a_{ij}x^{i}y^{j}$. A size of the original image A is assumed to be m×n, and a size of a target image B reduced by K (where K is 2) times is M×N. That is, K is equal to a quotient of m and M (K=m/M). A value of each pixel point of the original image A is known, and a value of each pixel of the target image B is unknown. If a value of each pixel (X, Y) of the target image B is to be calculated, a pixel (x, y) corresponding to the pixel (X, Y) in the original image A needs to be found first, then sixteen pixels closest to the pixel (x, y) in the original image A are used as parameters for calculating a value of the pixel (X, Y) of the target image B, and then weights $a_{ij}$ of the sixteen pixels are calculated by using Bicubic basis function, and a value of the pixel (X, Y) of the target image B is equal to weighted superposition of the sixteen pixels.

S2 includes S2". In S2", the down-sampled low dynamic range image is input into the second initial image processing model, so that the second initial image processing model processes the down-sampled low dynamic range image.

The down-sampling processing is performed on the low dynamic range image, so that the low dynamic range image is narrowed. Thus, the size of the image is reduced, and a processing speed of subsequent steps is improved. For example, the efficiency of the structural feature analysis on the low dynamic range image in S2 is improved, and improve a speed for training the image processing model is improved.

In some embodiments, the number of layers of the second initial image processing model is less than the number of layers of the first initial image processing model. Since the down-sampling processing is performed on the low dynamic range image in S2', and the size of the image is reduced, by inputting the down-sampled low dynamic range image into a small network model, the size of the image and a size of the network model are more matched, and a speed for training the second initial image processing model can also be improved.

For example, the first initial image processing model is a residual neural network (ResNet) model or a dense convolutional network (DenseNet) model. For example, the first initial image processing model is a 34-layer, 50-layer or even 101-layer ResNet model. The second initial image processing model may be a visual geometry group (VGG) network model, a GoogleNet Inception V1 network model, or a MobileNets network model. For example, the second initial image processing model is a 16-layer or 19-layer VGG network model.

The ResNet model is a residual network, which is characterized by easy optimization and can improve accuracy by adding a certain depth. Due to skip connections of residual blocks included in the ResNet network model, a problem of gradient disappearance caused by adding depth in a deep neural network is alleviated.

The VGG model uses a plurality of convolutional layers with a small (3×3) convolution kernel to replace a convolutional layer with a large (7×7) convolution kernel. Therefore, the parameters may be reduced; in addition, it is equivalent to performing more nonlinear mappings, and fitting and expression capability of the network may be increased.

In some embodiments, the second initial image processing model and the first initial image processing model may adopt a same type of network model.

It will be noted that an order of performing S1 and S2 is not limited. S1 and S2 may be performed simultaneously; or, S1 may be performed first, and then S2 is performed; or, S2 may be performed first, and then S1 is performed.

After the first high dynamic range image and the first coefficient are respectively obtained in S1 and S2, S3 may be performed.

In S3, a second high dynamic range image is generated according to the first high dynamic range image and the first coefficient.

In some embodiments, S3 includes: multiplying the first high dynamic range image by the first coefficient to generate the second high dynamic range image.

In some embodiments, the images used in the embodiments of the present disclosure are color images. The image data is a three-dimensional matrix with three channels, and the three channels are a first channel (R channel), a second channel (G channel) and a third channel (B channel). For example, the low dynamic range image is an M×N×3 image, where M is the number of rows of pixels of the image, N is the number of columns of pixels of the image, and 3 refers to RGB channels of each pixel.

In some embodiments, the images mentioned in the embodiments of the present disclosure, i.e., the low dynamic range image, the first high dynamic range image and the second high dynamic range image, each further include a fourth channel in addition to the RGB channels of the image. The fourth channel can reflect brightness information of the image.

In some embodiments, the fourth channel is a maximum value of a pixel of the image.

In some embodiments, before inputting the low dynamic range image into the first initial image processing model, the method further includes: extracting a maximum value of a pixel of the low dynamic range image as the fourth channel for channel connection. S1 includes inputting the low dynamic range image with four channels into the first initial image processing model.

For example, the maximum value of the pixel is a single value, and the single value is expanded into an M×N×1 matrix. Channel connection is performed on the M×N×1 matrix and three channels of the low dynamic range image (with a size of M×N×3) to obtain a low dynamic range image with a size of M×N×4.

In S1, after the low dynamic range image with the size of M×N×4 is processed by the first initial image processing model, the generated first high dynamic range image is a three-dimensional matrix. The first high dynamic range image also includes four channels.

In S2, after the low dynamic range image with the size of M×N×4 is processed by the second initial image processing model, the weight coefficient of the first high dynamic range image is a 1×1×3 matrix, and the number "3" refers to RGB channels of the image.

In S3, the first high dynamic range image is multiplied by the first coefficient to obtain a final result, and the second high dynamic range image is output, the second high dynamic range image including four channels. The first coefficient is a weight coefficient generated by the second initial image processing model performing the structural feature analysis on the low dynamic range image. Based on the first high dynamic range image, details of the second high dynamic range image are supplemented and restored by adjusting the weight coefficient. Therefore, the second high dynamic range image is closer to the real high dynamic range image corresponding to the low dynamic range image than the first high dynamic range image, and the second high dynamic range image can reflect more illumination information of the real scene.

In S4, a loss function is generated according to data pairs of the second high dynamic range image and the real high dynamic range image. The real high dynamic range image is the real high dynamic range image corresponding to the low dynamic range image.

In the above step, a value of the loss function is calculated to obtain loss values of the low dynamic range image in the first initial image processing model and the second initial image processing model. The loss function is obtained according to the data pairs of the second high dynamic range image and the real high dynamic range image.

Since the low dynamic range image, the first high dynamic range image and the second high dynamic range image in the embodiments of the present disclosure each further include the fourth channel in addition to the RGB channels of the image, the loss function is not only related to values of the RGB channels of the image, but also related to the fourth channel, i.e., the maximum value of the pixel of the image.

In some embodiments, the loss function includes an L1 loss and a tone mapping loss of RGB data pairs of the second high dynamic range image and the real high dynamic range image, and an L1 loss of data pairs of maximum values of pixels of the second high dynamic range image and the real high dynamic range image. A calculation formula of the loss function Loss is as follows:

$$\text{Loss} = \left\| \hat{I} - I_{gt} \right\|_1 +$$
$$0.1 \times \left\| \log \frac{(1 + 5000 \times \hat{I})}{5001} - \log \frac{(1 + 5000 \times I_{gt})}{5001} \right\|_2 + (1/30) \times \left\| \hat{I}^{max} - I_{gt}^{max} \right\|_1$$

Here, $\hat{I}$ is a value of an RGB data pair of the second high dynamic range image, $I_{gt}$ is a value of an RGB data pair of the real high dynamic range image, $\hat{I}^{max}$ is a data pair of a maximum value of a pixel of the second high dynamic range image, and $I_{gt}^{max}$ is a data pair of a maximum value of a pixel of the real high dynamic range image; and the coefficients of the formula are preset.

Since the image has different extremum values under different exposure conditions, the maximum value of the pixel of the image is extracted as the fourth channel of the image during the training process, and a constraint condition of the maximum values of the pixels of the second high dynamic range image and the real high dynamic range image is added for the loss function to constrain the training process, which improves training accuracy of both the first initial image processing model and the second initial image processing model in a more targeted manner, optimize the training process of the network model, and improve a high dynamic range reconstruction performance of a first target image processing model and a second target image processing model that are obtained finally.

In S5, the first initial image processing model and the second initial image processing model are trained with the loss function; it is determined that whether the value of the loss function no longer decreases; if the value of the loss function continues to decrease (i.e., the loss function does not converge), S6 is performed, and if the value of the loss function no longer decreases, S7 is performed.

In S6, parameters of the first initial image processing model and parameters of the second initial image processing model are updated.

In some embodiments, in a process of training the first initial image processing model and the second initial image processing model with the loss function and updating the parameters of the first initial image processing model and the parameters of the second initial image processing model, a network optimizer is an Adam optimizer, and a learning rate is 1e-4.

Steps S1 to S5 are repeated until the value of the loss function no longer decreases, and then S7 is performed.

In S7, a first initial image processing model and a second initial image processing model that are obtained from the final training are used as the trained first target image processing model and the trained second target image processing model.

In S5 to S7, according to a training strategy, the first initial image processing model and the second initial image processing model are trained for multiple times. In the training process, by continuously updating the parameters of the first initial image processing model and the parameters of the second initial image processing model, the second high dynamic range image output each time is closer to a dynamic range of the real scene, and the value of the loss function gradually decreases until the loss function no longer decreases, that is, the loss function converges. In this case, the first initial image processing model and the second initial image processing model establish a mapping relationship from a single low dynamic range image to a high dynamic range image. The first initial image processing model and the second initial image processing model that are obtained from the final training are used as the trained first target image processing model and the trained second target image processing model. By using the trained first target image processing model and the trained second target image processing model, reconstruction from the low dynamic range image to the high dynamic range image may be directly completed in the subsequent image generation process.

In the method for training the image processing model provided in the embodiments of the present disclosure, the first initial image processing model and the second initial image processing model are combined. By training the first initial image processing model and the second initial image processing model, the low dynamic range image is input into the first initial image processing model to generate the first high dynamic range image, and the first coefficient is generated by the second initial image processing model. The first coefficient is the weight coefficient of the first high dynamic range image for performing the structural feature analysis on the low dynamic range image, and the details of the first high dynamic range image can be restored through the first coefficient. The final high dynamic range image may be obtained according to values output by the first initial image processing model and the second initial image processing model, and the final high dynamic range image is closer to the real high dynamic range image. In this case, it is possible to ensure authenticity of the first target image processing model and the second target image processing model that are obtained from the final training, and ensure a high dynamic range reconstruction quality of the image. In addition, before the low dynamic range image is input into the second initial image processing model, the down-sampling processing is further performed on the second initial image processing model, and the second initial image processing model adopts a small network, thereby improving training efficiency and reducing work time.

Figure 4:
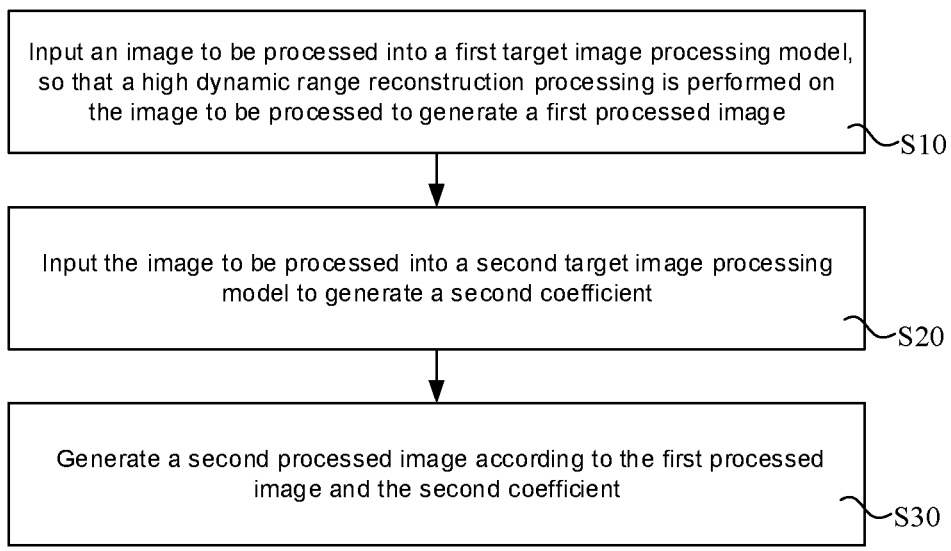
FIG. 4 is a flow diagram of a method for generating a high dynamic range image, in accordance with some embodiments.
Figure 5:
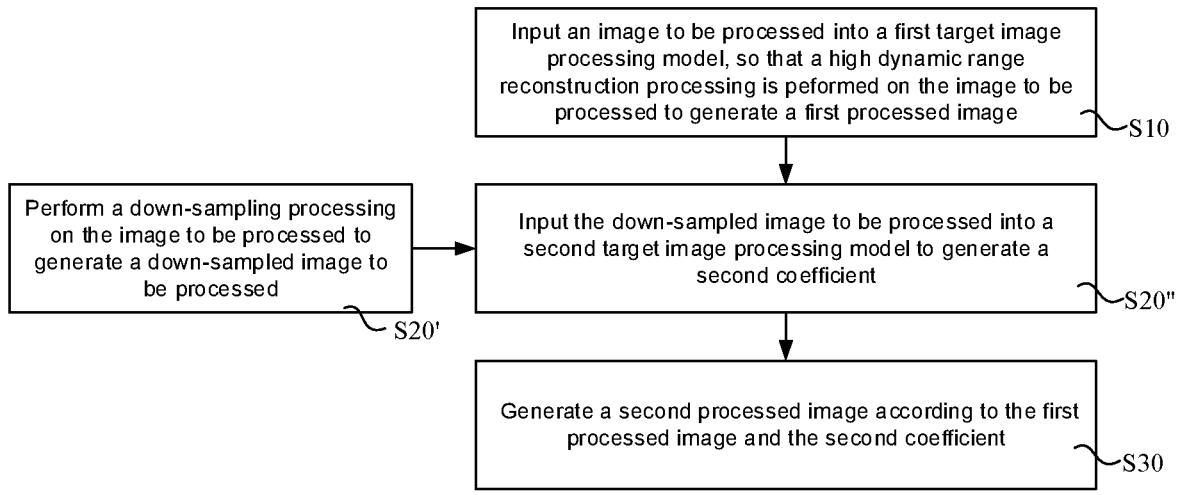
FIG. 5 is a flow diagram of a method for generating a high dynamic range image, in accordance with some other embodiments.
Figure 6:
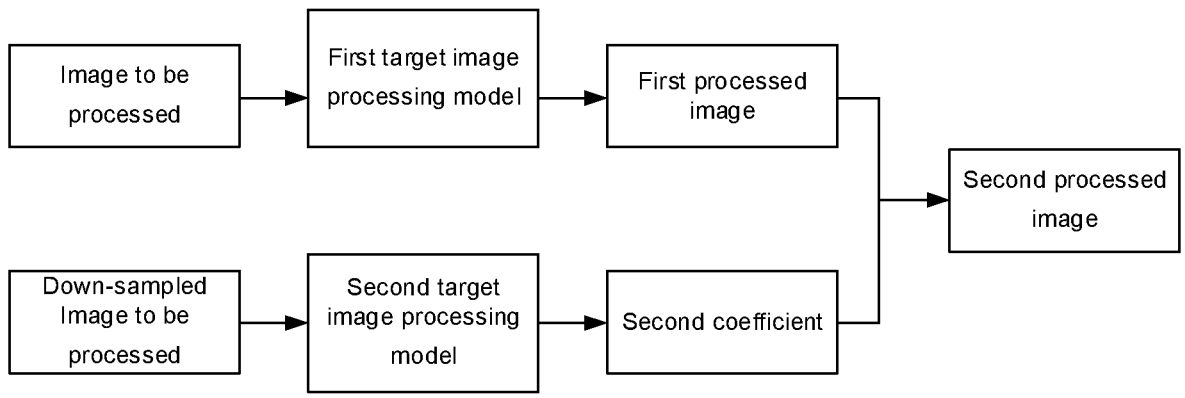
FIG. 6 is a step diagram of a method for generating a high dynamic range image, in accordance with some embodiments.

As shown in FIGS. 4 to 6, some embodiments of the present disclosure further provide a method for generating a high dynamic range image, and the method includes the following steps S10 to S30.

In S10, an image to be processed is input into a first target image processing model, so that a high dynamic range reconstruction processing is performed on the image to be processed to generate a first processed image. The image to be processed is a low dynamic range image, and the first processed image is a high dynamic range image.

The first target image processing model is obtained by training through the method for training the image processing model described above. The image to be processed may be any low dynamic range image that needs high dynamic range reconstruction.

In S20, the image to be processed is input into a second target image processing model to generate a second coefficient.

The second coefficient is a weight coefficient generated by the second target image processing model performing a structural feature analysis on the image to be processed. The second coefficient is used for detail supplementation and restoration of the first processed image.

The second target image processing model is obtained by training through the method for training the image processing model described above.

In some embodiments, as shown in FIG. 5, before inputting the image to be processed into the second target image processing model to generate the weight coefficient of the high dynamic range image, the method further includes step S20'. In S20', a down-sampling processing is performed on the image to be processed to generate a down-sampled image to be processed.

S20 includes S20". In S20", the down-sampled image to be processed is input into the second target image processing model, so that the second target image processing mode processes the down-sampled image to be processed.

As for steps of down-sampling the image to be processed, reference may be made to the steps of down-sampling the low dynamic range image described above, and details will not be repeated here.

The number of layers of the second initial image processing model is less than the number of layers of the first initial image processing model. In some embodiments, the number of layers of the second target image processing model is less than the number of layers of the first target image processing model. For example, the first target image processing model may be a ResNet model or a DenseNet model, and the second target image processing model may be a VGG network model, a GoogleNet Inception V1 network model, or a MobileNets network model.

In this case, by performing the down-sampling processing on the image to be processed, the size of the image is reduced, and the second target image processing model adopt a small network model, which may improve a processing rate of the image.

In S30, a second processed image is generated according to the first processed image and the second coefficient.

The second processed image is a high dynamic range image. An image quality of the second processed image is higher than that of the first processed image, and the second processed image is closer to the real scene.

In some embodiments, S30 includes: multiplying data of the first processed image by the second coefficient to generate the second processed image.

In the method for generating the high dynamic range image provided in the embodiments of the present disclosure, the first target image processing model and the second target image processing model are used to process the low dynamic range image, and the first target image processing model and the second target image processing model are obtained by training through the method for training the image processing model described above. The first target image processing model performs the high dynamic range reconstruction on the low dynamic range image to output the first processed image, and the second target image processing model performs the structural feature analysis on the low dynamic range image to generate the weight coefficient (the second coefficient). Therefore, details of the first processed image may be supplemented and restored, and the second processed image obtained according to the first processed image and the weight coefficient to be closer to the real high dynamic image. In this way, the low dynamic range image may be reconstructed into the real high dynamic range image as much as possible by using the trained first target image processing model and the trained second target image processing model. This method improves the authenticity of the generated high dynamic range image, and can restore the illumination information of the real scene more accurately.

Figure 7:
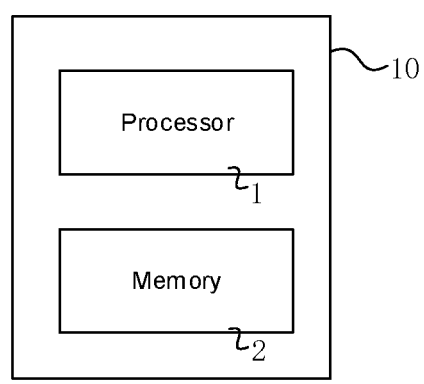
FIG. 7 is a structural diagram of an electronic device, in accordance with some embodiments.

As shown in FIG. 7, some embodiments of the present disclosure further provide an electronic device 10, and the electronic device includes a processor 1, a memory 2, and a computer program stored on the memory 2 and executable on the processor 1.

The processor 1 is configured to input a low dynamic range image into a first initial image processing model, so that high dynamic range reconstruction processing is performed on the low dynamic range image to generate a first high dynamic range image.

The processor 1 is further configured to input the low dynamic range image into a second initial image processing model to generate a first coefficient.

The processor 1 is further configured to generate a second high dynamic range image according to data of the first high dynamic range image and the first coefficient.

The processor 1 is further configured to generate a loss function according to data pairs of the second high dynamic range image and a real high dynamic range image. The real high dynamic range image is a real high dynamic range image corresponding to the low dynamic range image.

The processor 1 is further configured to train the first initial image processing model and the second initial image processing model with the loss function.

The memory 2 is configured to store the data of the first high dynamic range image, the first coefficient, and data of the second high dynamic range image.

In some embodiments, the processor 1 is further configured to multiply the data of the first high dynamic range image by the first coefficient, so as to generate the second high dynamic range image.

The processor 1 is further configured to perform a down-sampling processing on the low dynamic range image to generate a down-sampled low dynamic range image before inputting the low dynamic range image into the second initial image processing model.

In some embodiments, the processor 1 is further configured to input an image to be processed into a first target image processing model, so that a high dynamic range reconstruction processing is performed on the image to be processed to generate a first processed image, the image to be processed being a low dynamic range image.

The processor 1 is further configured to input the image to be processed into a second target image processing model to generate a second coefficient. The first target image processing model and the second target image processing model are obtained by training through the method for training the image processing model provided in the embodiments of the present disclosure.

The processor 1 is further configured to generate a second processed image according to the first processed image and the second coefficient.

The memory 2 is further configured to store the first processed image, the second coefficient and the second processed image.

In some embodiments, the processor 1 is further configured to multiply the first processed image by the second coefficient to generate a second processed image.

The processor 1 is further configured to perform a down-sampling processing on the image to be processed to generate a down-sampled image to be processed before inputting the image to be processed into the second target image processing model.

For example, the processor may be a central processing unit (CPU), or other general-purpose processor, a digital signal processor (DSP), an application specific integrated circuit (ASIC), a field programmable gate array (FPGA) or other programmable logic device, a discrete gate or a transistor logic device, a discrete hardware component, etc. The general-purpose processor may be a microprocessor, or may be any conventional processor.

The memory may be a read-only memory (ROM) or a static storage device of other type that may store static information and instructions, a random access memory (RAM) or a dynamic storage device of other type that may store information and instructions, an electrically erasable programmable read-only memory (EEPROM), a compact disc read-only memory (CD-ROM) or other optical disc storage medium (including a compact disc, a laser disc, an optical disc, a digital versatile disc, a Blue-ray disc, etc.), a magnetic disc storage medium or other magnetic storage device, or any other medium that can be used to carry or store desired program code in the form of instructions or data structures and can be accessed by a computer, but is not limited thereto. The memory may exist independently and be connected to the processor through a communication bus. Alternatively, the memory may be integrated with the processor.

Beneficial effects of the electronic device are the same as those of the method for training the image processing model and the method for generating the high dynamic range image described in the embodiments mentioned above, and details will not be repeated here.

Some embodiments of the present disclosure provide a computer-readable storage medium (e.g., a non-transitory computer-readable storage medium) storing computer program instructions that, when executed on a processor, cause the processor to perform the method for training the image processing model provided in any of the above embodiments, and/or the method for generating the high dynamic range image provided in any of the above embodiments.

For example, the computer-readable storage medium may include, but is not limited to, a magnetic storage device (e.g., a hard disk, a floppy disk or a magnetic tape), an optical disk (e.g., a compact disk (CD), or a digital versatile disk (DVD)), a smart card, or a flash memory device (e.g., an erasable programmable read-only memory (EPROM), a card, a stick or a key driver).

Various computer-readable storage media described in the present disclosure may represent one or more devices and/or other machine-readable storage media that are used to store information. The term "machine-readable storage media" may include, but is not limited to, wireless channels and various other media capable of storing, containing and/or carrying instructions and/or data.

Some embodiments of the present disclosure further provide a computer program product. The computer program product includes computer program instructions that, when executed on a computer, cause the computer to perform one or more steps of the method for training the image processing model as described in the embodiments described above, and/or, one or more steps of the method for generating the high dynamic range image as described in the embodiments mentioned above.

Some embodiments of the present disclosure provide a computer program. When executed on a computer, the computer program causes the computer to perform one or more steps of the method for training the image processing model as described in the embodiments mentioned above, and/or, one or more steps of the method for generating the high dynamic range image as described in the embodiments mentioned above.

Beneficial effects of the computer-readable storage medium, the computer program product and the computer program are the same as those of the method for training the image processing model and the method for generating the high dynamic range image described in the embodiments mentioned above, and details will not be detailed here.

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A method for training an image processing model, comprising:
inputting a low dynamic range image into a first initial image processing model, so that a high dynamic range reconstruction processing is performed on the low dynamic range image to generate a first high dynamic range image;
inputting the low dynamic range image into a second initial image processing model to generate a first coefficient;
generating a second high dynamic range image according to the first high dynamic range image and the first coefficient;
generating a loss function according to data pairs of the second high dynamic range image and a real high dynamic range image, wherein the real high dynamic range image corresponds to the low dynamic range image; and
training the first initial image processing model and the second initial image processing model with the loss function, so that a trained first target image processing model and a trained second target image processing model are obtained,
wherein the first coefficient is a weight coefficient generated by the second initial image processing model performing a structural feature analysis on the low dynamic range image.

2. The method for training the image processing model according to claim 1, wherein the weight coefficient is a 1×1×3 matrix.

3. The method for training the image processing model according to claim 1, wherein the low dynamic range image, the first high dynamic range image and the second high dynamic range image each include RGB channels, and further include a fourth channel; and
the loss function is further related to the fourth channel.

4. The method for training the image processing model according to claim 3, wherein the fourth channel is a maximum value of a pixel; and
the loss function includes an L1 loss and a tone mapping loss of RGB data pairs of the second high dynamic range image and the real high dynamic range image, and an L1 loss of data pairs of maximum values of pixels of the second high dynamic range image and the real high dynamic range image.

5. The method for training the image processing model according to claim 1, wherein generating the second high dynamic range image according to the first high dynamic range image and the first coefficient includes:
multiplying the first high dynamic range image by the first coefficient to generate the second high dynamic range image.

6. The method for training the image processing model according to claim 1, wherein before inputting the low dynamic range image into the second initial image processing model, the method for training the image processing model further comprises:
performing a down-sampling processing on the low dynamic range image to generate a down-sampled low dynamic range image.

7. The method for training the image processing model according to claim 6, wherein a number of layers of the second initial image processing model is less than a number of layers of the first initial image processing model.

8. The method for training the image processing model according to claim 1, further comprising: in a process of training the first initial image processing model and the second initial image processing model with the loss function, if the loss function does not converge, updating parameters of the first initial image processing model and parameters of the second initial image processing model, wherein a network optimizer is an Adam optimizer, and a learning rate is 1e-4.

9. A method for generating a high dynamic range image, comprising:
inputting an image to be processed into a first target image processing model, so that a high dynamic range reconstruction processing is performed on the image to be processed to generate a first processed image, the image to be processed being the low dynamic range image;
inputting the image to be processed into a second target image processing model to generate a second coefficient, wherein the first target image processing model and the second target image processing model are the trained first target image processing model and the trained second target image processing model obtained by the method for training the image processing model according to claim 1; and
generating a second processed image according to the first processed image and the second coefficient.

10. The method for generating the high dynamic range image according to claim 9, wherein the second coefficient is a weight coefficient generated by the second target image processing model performing a structural feature analysis on the image to be processed.

11. The method for generating the high dynamic range image according to claim 9, wherein generating the second processed image according to the first processed image and the second coefficient includes:
multiplying the first processed image by the second coefficient to generate the second processed image.

12. The method for generating the high dynamic range image according to claim 9, wherein before inputting the image to be processed into the second target image processing model, the method for generating the high dynamic range image further comprises:
performing a down-sampling processing on the image to be processed to generate a down-sampled image to be processed.

13. The method for generating the high dynamic range image according to claim 12, wherein a number of layers of the second target image processing model is less than a number of layers of the first target image processing model.

14. An electronic device comprising: a processor, a memory, and a computer program stored on the memory and executable on the processor, wherein
the processor is configured to input a low dynamic range image into a first initial image processing model, so that a high dynamic range reconstruction processing is performed on the low dynamic range image to generate a first high dynamic range image;
the processor is further configured to input the low dynamic range image into a second initial image processing model to generate a first coefficient;
the processor is further configured to generate a second high dynamic range image according to the first high dynamic range image and the first coefficient;
the processor is further configured to generate a loss function according to data pairs of the second high dynamic range image and a real high dynamic range image; wherein the real high dynamic range image is a real high dynamic range image corresponding to the low dynamic range image;
the processor is further configured to train the first initial image processing model and the second initial image processing model with the loss function, so that a trained first target image processing model and a trained second target image processing model are obtained; and
the memory is configured to store data of the first high dynamic range image, the first coefficient, and data of the second high dynamic range image,
wherein the first coefficient is a weight coefficient generated by the second initial image processing model performing a structural feature analysis on the low dynamic range image.

15. The electronic device according to claim 14, wherein the processor is further configured to multiply the first high dynamic range image by the first coefficient to generate the second high dynamic range image; and
the processor is further configured to perform a down-sampling processing on the low dynamic range image to generate a down-sampled low dynamic range image before inputting the low dynamic range image into the second initial image processing model.

16. The electronic device according to claim 14, wherein the processor is further configured to input an image to be processed into the first target image processing model, so that a high dynamic range reconstruction processing is performed on the image to be processed to generate a first processed image, the image to be processed being the low dynamic range image;
the processor is further configured to input the image to be processed into the second target image processing model to generate a second coefficient;
the processor is further configured to generate a second processed image according to the first processed image and the second coefficient; and
the memory is further configured to store the first processed image, the second coefficient and the second processed image.

17. The electronic device according to claim 16, wherein the processor is further configured to multiply the first processed image by the second coefficient to generate the second processed image; and
the processor is further configured to perform a down-sampling processing on the image to be processed to generate a down-sampled image to be processed before inputting the image to be processed into the second target image processing model.

18. A non-transitory computer-readable storage medium storing computer program instructions that, when executed on a processor, cause the processor to perform the method for training the image processing model according to claim 1.

19. A non-transitory computer-readable storage medium storing computer program instructions that, when executed on a processor, cause the processor to perform the method for generating the high dynamic range image according to claim 9.

20. A method for training an image processing model, comprising:

inputting a low dynamic range image into a first initial image processing model, so that a high dynamic range reconstruction processing is performed on the low dynamic range image to generate a first high dynamic range image;

inputting the low dynamic range image into a second initial image processing model to generate a first coefficient;

generating a second high dynamic range image according to the first high dynamic range image and the first coefficient;

generating a loss function according to data pairs of the second high dynamic range image and a real high dynamic range image, wherein the real high dynamic range image corresponds to the low dynamic range image; and training the first initial image processing model and the second initial image processing model with the loss function, so that a trained first target image processing model and a trained second target image processing model are obtained;

wherein generating the second high dynamic range image according to the first high dynamic range image and the first coefficient includes:

multiplying the first high dynamic range image by the first coefficient to generate the second high dynamic range image.

* * * * *